United States Patent

[11] 3,617,844

| [72] | Inventor | James W. Grygera<br>Kenosha, Wis. |
|---|---|---|
| [21] | Appl. No. | 826,629 |
| [22] | Filed | May 21, 1969 |
| [45] | Patented | Nov. 2, 1971 |
| [73] | Assignee | Eaton Yale & Towne Inc.<br>Cleveland, Ohio |

[54] CONTROLLED-VELOCITY DRIVE
8 Claims, 8 Drawing Figs.

[52] U.S. Cl. .................................................. 318/331, 318/327
[51] Int. Cl. .................................................. H02p 5/16
[50] Field of Search .......................................... 318/308, 311, 317, 345, 327, 331; 307/127

[56] References Cited
UNITED STATES PATENTS

| 2,785,367 | 3/1957 | Roman ........................ | 318/308 |
| 3,037,157 | 5/1962 | Young ......................... | 318/317 |
| 3,284,688 | 11/1966 | Black .......................... | 318/345 |
| 3,385,986 | 5/1968 | Smith .......................... | 318/308 |
| 3,413,534 | 11/1968 | Stringer ....................... | 318/345 |
| 3,470,437 | 9/1969 | Douglass ...................... | 318/308 |
| 3,487,279 | 12/1969 | Stringer ....................... | 318/345 |
| 3,495,130 | 2/1970 | Bruner ......................... | 307/127 |
| 3,456,227 | 9/1969 | Ivie ............................. | 318/345 |

*Primary Examiner*—Benjamin Dobeck
*Assistant Examiner*—Thomas Langer
*Attorney*—Koenig, Senniger, Powers and Leavitt ABSTRACT: A DC controlled-velocity drive. An SCR power bridge is energized by a three-phase AC power source for supplying DC voltage to the armature of a DC drive motor when the SCR's are triggered, shifting of the phase of triggering causing variation of the DC voltage for varying the motor speed. Various regenerative and degenerative feedback circuits are employed, among them being a feedback circuit sensing this DC voltage and a feedback circuit sensing the motor armature current. These feedback circuits produce feedback signals which are compared with motor speed and armature current reference signals for the purpose of controlling the phase of triggering of the SCR's in order to maintain the motor speed substantially equal to a preselected motor speed while preventing the motor armature current from exceeding a predetermined maximum.

3,617,844

CONTROLLED-VELOCITY DRIVE

BACKGROUND OF THE INVENTION

This invention relates to a controlled-velocity drive and more particularly, to a solid state control for controlling the speed of a DC drive motor.

Direct current controlled-velocity drives hold certain advantages over other types of drives, e.g., variable frequency AC drive systems, among them being simplicity and inherent extremely fast response. Heretofore, DC drive systems have typically employed control systems having magnetic components for controlling the triggering of switching devices employed to power the DC motor. While typically providing quite good speed regulation, magnetic firing components provide somewhat limited response to varying load conditions and are not easily adjusted.

SUMMARY OF THE INVENTION

Among the several objects of the invention may be noted the provision of a controlled-velocity DC drive having inherently rapid response to abrupt load and speed changes; the provision of such a drive which is inherently stable under substantially all load conditions; the provision of such a drive having substantially critical damping over the entire speed range of the drive; the provision of such a drive having very close speed regulation characteristics over a wide speed range; the provision of a control for a DC drive motor including means for preventing the motor armature current from exceeding a predetermined maximum; the provision of such a control which is useful for controlling a wide range of sizes of DC motors; the provision of such a control which is highly reliable in operation, relatively simple in construction, relatively small in size and which is easily installed and serviced. Other objects and features will be in part apparent and in part pointed out hereinafter.

Briefly, a control of the present invention is useful for controlling a DC motor in a controlled-velocity drive, the motor speed varying substantially as a function of the voltage applied to its armature. According to a preferred form, a control of this invention includes a plurality of switching devices interconnected with the motor armature and a multiphase AC power source for supplying DC voltage to the motor armature when triggered in sequence. The phase of triggering of the devices determines the magnitude of the DC voltage applied to the motor armature thereby to determine its speed. The control includes a plurality of feedback circuits, including a feedback circuit sensing the motor speed and producing a degenerative feedback signal varying as a function thereof. A reference voltage is produced which is proportional to a preselected motor speed. A further feedback circuit senses the motor armature current and produces a further feedback signal varying as a function thereof. A second reference voltage is produced which is proportional to a preselected maximum armature current. Circuitry is included for producing a degenerative control signal which varies as a function of the voltage by which the second feedback signal exceeds the second reference voltage. This degenerative control signal, the motor speed feedback signal, and the speed reference voltage are algebraically summed. Circuitry controls the phase of triggering of the switching devices in accordance with this algebraic sum substantially to maintain the motor speed substantially equal to the preselected motor speed while, at the same time, substantially preventing the motor armature current from exceeding the preselected maximum.

BRIEF DESCRIPTION OF THE DRAWINGS

FIG. 2 is an overall schematic circuit diagram of a DC drive of the present invention, various subsidiary circuits of the control being represented by dashed line rectangles and shown in FIGS. 3-8, of which:

Corresponding reference characters indicate corresponding parts throughout the several views of the drawings.

GENERAL DESCRIPTION OF THE PREFERRED EMBODIMENT

Figure 1:
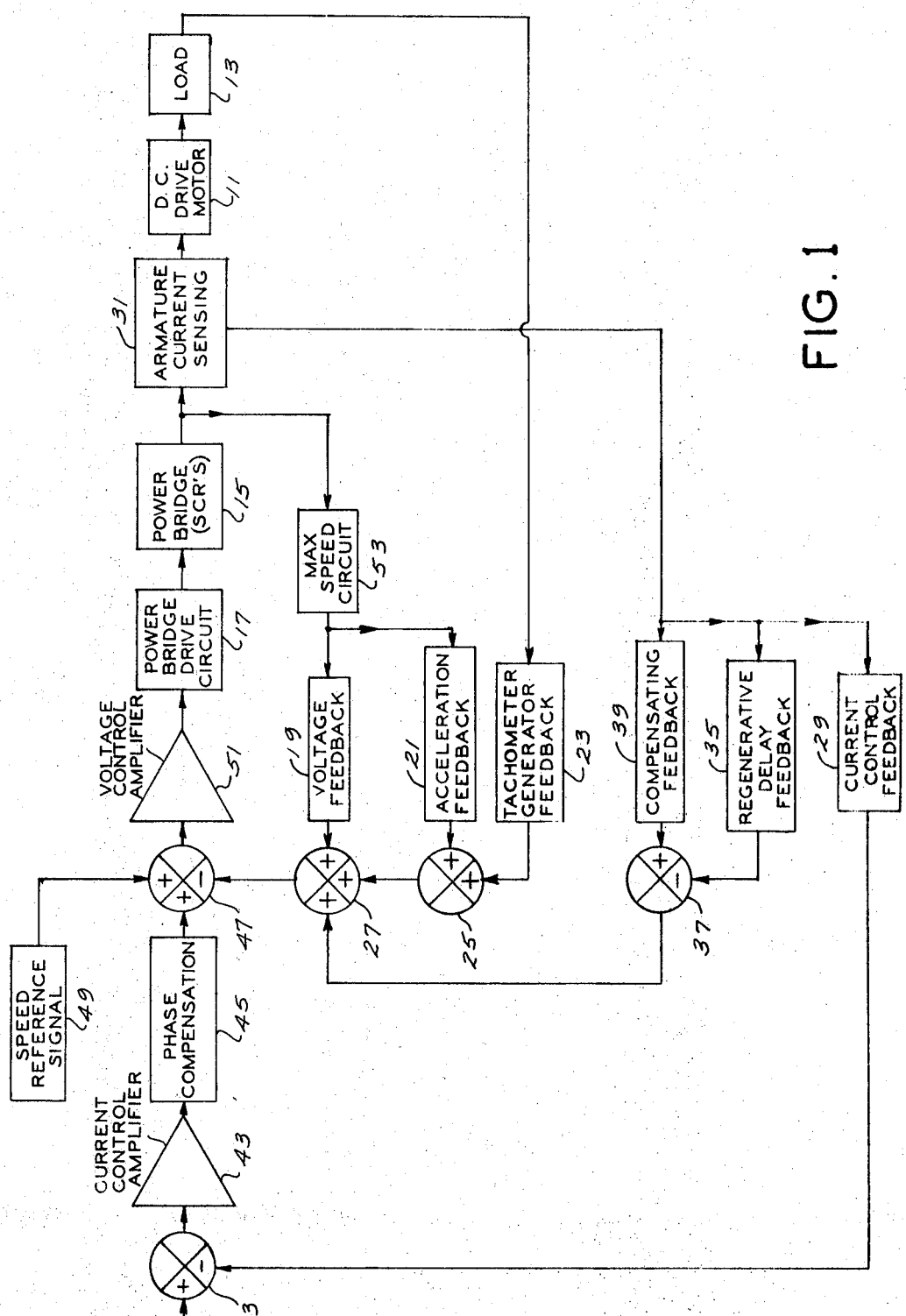
FIG. 1 is a block diagram illustrating operationally the major components of a drive of this invention with their functional interconnections.

Referring now to the drawings, and more particularly to the block diagram of FIG. 1 which is a functional representation of a direct current controlled-velocity drive of the present invention, designated at 11 is a DC drive motor adapted to drive a load 13 under the control of apparatus of this invention. As is known to those skilled in the art, the speed of the DC motor varies substantially as a function of the average DC voltage applied to its armature. To supply DC power to motor 11, there is provided a power bridge 15 including a plurality of triggerable semiconductor current-switching devices which are interconnected with the motor armature and which are energized by a multiphase AC power source so that a DC voltage is supplied to the motor armature when the switching devices are triggered in sequence by a bridge drive circuit indicated generally at 17. As will be more clearly apparent from the discussion which follows, shifting of the phase of triggering of the switching devices causes variation of the DC voltage supplied to the motor to vary its speed.

Indicated at 19 is a feedback circuit for sensing the DC voltage supplied to the motor armature. This feedback circuit produces a first degenerative feedback signal varying as a function of this supplied voltage. A second feedback circuit indicated at 21 is provided to sense the rate of change of the DC voltage supplied to the motor armature and produces a second degenerative feedback signal varying as a function of this rate of change. Since the supplied DC voltage determines the motor speed, this second degenerative feedback signal in effect represents an incipient rate of change of motor speed and is thus an acceleration feedback. The control optionally includes a third feedback circuit for sensing the motor speed, this circuit being indicated at 23 and including a tachometer generator or similar tachometric means having an output signal varying as a function of the precise actual motor speed. The feedback signals thus generated are applied to appropriate summing junctions such as are indicated at 25 and 27.

In a preferred form, the apparatus includes a further feedback circuit indicated at 29. Means indicated at 31 includes an impedance connnected in series with the armature of motor 11. A voltage is developed across the impedance which is a function of the motor armature current. By means of the feedback circuit 29 which, as indicated in the drawing, functions as a current control feedback, this voltage is employed to produce a further feedback signal for current control purposes, the signal being applied to a summing junction 33.

The apparatus includes an additional feedback circuit 35 having a delay network responsive to the voltage developed across the impedance of the armature current-sensing means 31. Feedback circuit 35 produces a regenerative delayed feedback signal which varies as a function of the motor armature current and which is applied to a summing junction 37. In addition to this latter feedback circuit, a compensating feedback circuit 39 is provided which senses the voltage developed across the impedance of means 31 and produces a compensating feedback signal varying as a function of the developed voltage. Together, feedback circuits 35 and 39 form a composite network for the purpose of IR compensation and control stabilization by means of current feedback (torque). This compensating feedback signal is also applied to summing junction 37. The sum of the feedback signals thus applied to summing junction 37 is in turn applied to summing junction 27 where the various feedback signals developed by feedback circuits 29, 21 and 23 are also summed.

Indicated at 41 is means for producing a reference voltage which is proportional to a preselected maximum motor armature current, i.e., is a current limit reference signal and this voltage is applied with the feedback signal produced by feedback circuit 29 to summing junction 33. The latter is not merely an isolated solder joint within the control circuitry but is instead representative of a pair of inputs to a current control amplifier indicated at 43 which compares the motor armature current feedback signal produced by feedback circuit 29 with the current limit reference signal produced by the circuitry at 41. Amplifier 43 functions as a voltage comparator means for producing a degenerative control signal which varies as a function of the voltage by which the current feedback signal exceeds the current reference voltage. The output of this current control amplifier 43 is supplied to a phase compensation circuit 45 which applies the compensated output to a summing junction 47. Means, indicated at 49, is provided for producing a reference voltage proportional to a preselected motor speed, i.e., a speed reference signal, and this voltage is also applied to summing junction 47. Summing junction 47 actually represents a pair of inputs to a voltage control amplifier indicated at 51. Amplifier 51 is also a voltage comparator and algebraically sums the various feedback signals summed at summing junction 27 with the speed reference signal and the output of current control amplifier 43 to produce a triggering control signal varying as a function of this algebraic sum. This signal is supplied to the power bridge drive circuitry at 17 which is operative to supply triggering pulses to the SCR's and to controllably shift the phase of the triggering pulses in response to the control signal to maintain the motor speed substantially equal to the preselected motor speed while substantially preventing the motor armature current from exceeding the preselected maximum. THe maximum speed of motor 11 is determined by a maximum speed circuit 53 interconnected with feedback circuit 19.

Power Circuitry

Figure 2:
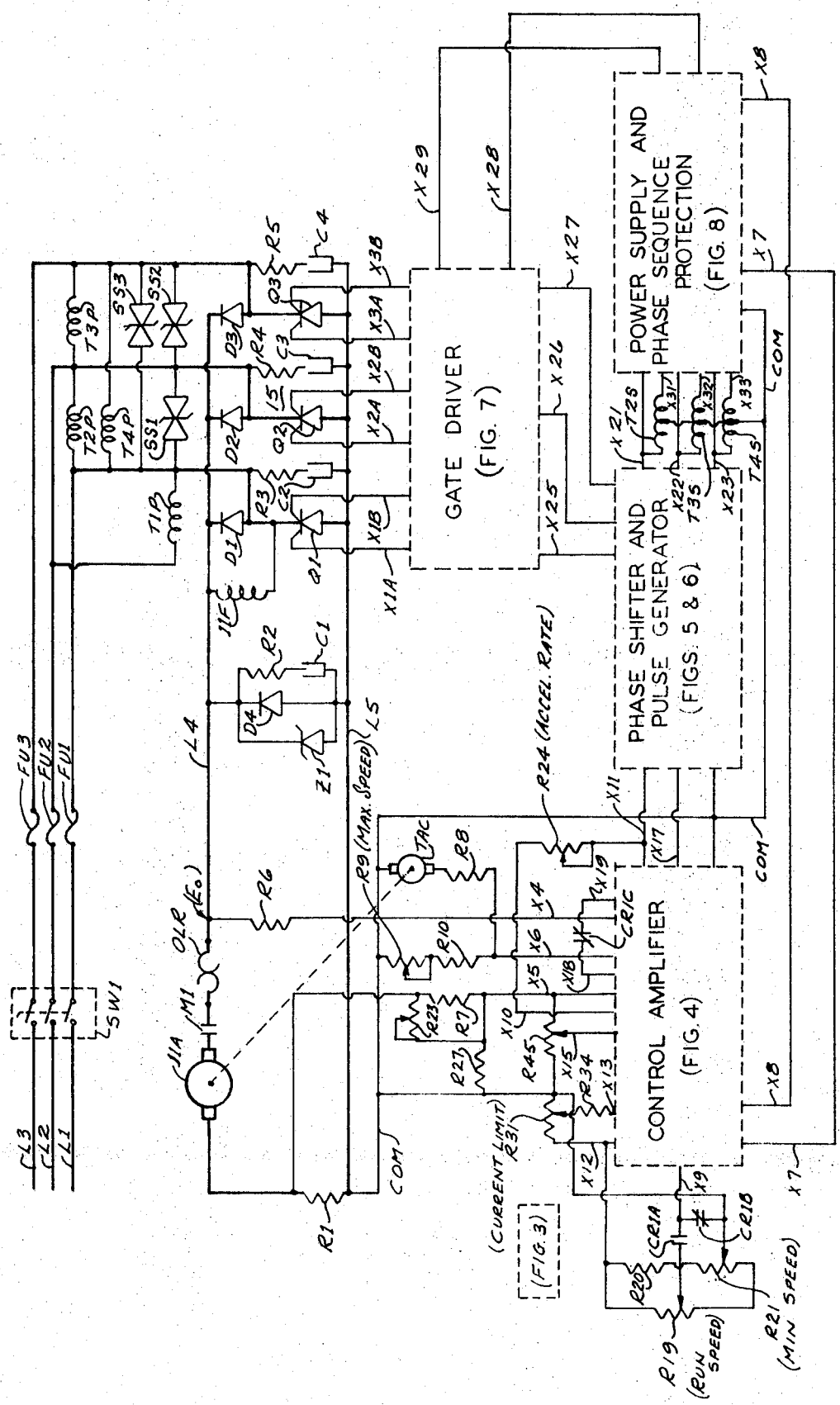

Referring now to the overall wiring diagram of FIG. 2, a trio of power leads L1, L2 and L3 connects the apparatus to a conventional source of three-phase 60 Hz. AC power at a voltage, for example, of 460 v.a.c. Power is supplied by leads L1–L3 when a main power switch SW1 is closed through respective fuses FU1–FU3 to a power bridge comprising respective silicon controlled rectifiers (SCR's )Q1–Q3. As is known to those skilled in the art, an SCR is a triggerable semiconductor current-switching device which, when triggered, is conductive on alternate half-cycles of the AC waveform applied across its cathode and anode terminals. Each of leads L1–L3 is connected to a respective cathode of the SCR's Q1–Q3. Each SCR has its main terminals, i.e., its cathode and anode, connected in series with a respective diode D1–D3 across a pair of conductors L4 and L5 to provide a series power circuit including the armature 11A of drive motor 11 for supplying power thereto. The motor includes a shunt field 11F connected across diode D1.

Motor 11 is a conventional commercially available DC motor of a suitable horsepower size which may vary from a fraction of a horsepower to hundreds of horsepower, it being understood that the various ratings of the components of the control, e.g., SCR's Q1–Q3 and diodes D1–D3, are chosen to correspond with a certain range of motor horsepower sizes but with the principles or operation being the same in any case.

Also connected in the series circuit with motor armature 11A are a set of normally open contacts M1 of a magnetic contactor (which will be described later) and a conventional thermal overload relay OLR adapted to break the circuit if excessive current is drawn. The circuit includes also a resistor R1 constituting the impedance mentioned in connection with circuit 31 in FIG. 1. Connected across conductors L4 and L5 is a circuit including a free-wheeling or so-called half-back diode D4 to shunt any inductively induced transients thereacross. Parallel connected with diode D4 are a selenium surge suppressor diode Z1 and a series-connected resistor R2 and capacitor C1 constituting a transient suppression network. Each of the SCR's Q1–Q3 includes a respective transient suppression or so-called snubber circuit constituted by a series-connected respective resistor R3–R5 and capacitor C2–C4 connected across its cathode and anode.

The primary winding T1P of a transformer T1 and also the primary winding T2P of a transformer T2 are connected across leads L1 and L2. The primary winding T3P of a transformer T3 is connected between leads L2 and L3 and the primary winding T4P of another transformer T4 bridges leads L1 and L3. Conventional surge suppressors SS1, SS2 and SS3 are connected between leads L1 and L2, leads L2 and L3, and leads L1 and L3, respectively.

The speed of motor 11 is substantially proportional to the average value of the DC voltage $E_o$ applied across its armature 11A. By uniformly varying or shifting the phase of triggering of each of SCR's Q1–Q3, i.e., its time of triggering, the firing angles of the SCR's are identically controllably varied with respect to the applied sinusoidal waveform to cause a change in the effective or average voltage applied to the motor armature. This permits variation of the motor speed of the motor over a desired speed range. In order to supply the necessary triggering pulses to the gate or triggering terminals of each of the SCR's Q1–Q3, respective pairs of leads X1A and X1B, X2A and X2B, and X3A and X3B connect the gate and cathode of each of the SCR's to gate driver circuitry shown in detail in FIG. 7. This gate driver circuitry applies a strong so-called "hard" firing pulse to each of the SCR's in sequence. The gate driver circuitry and its operation are explained in detail hereinbelow:

Control Amplifier

Figure 4:
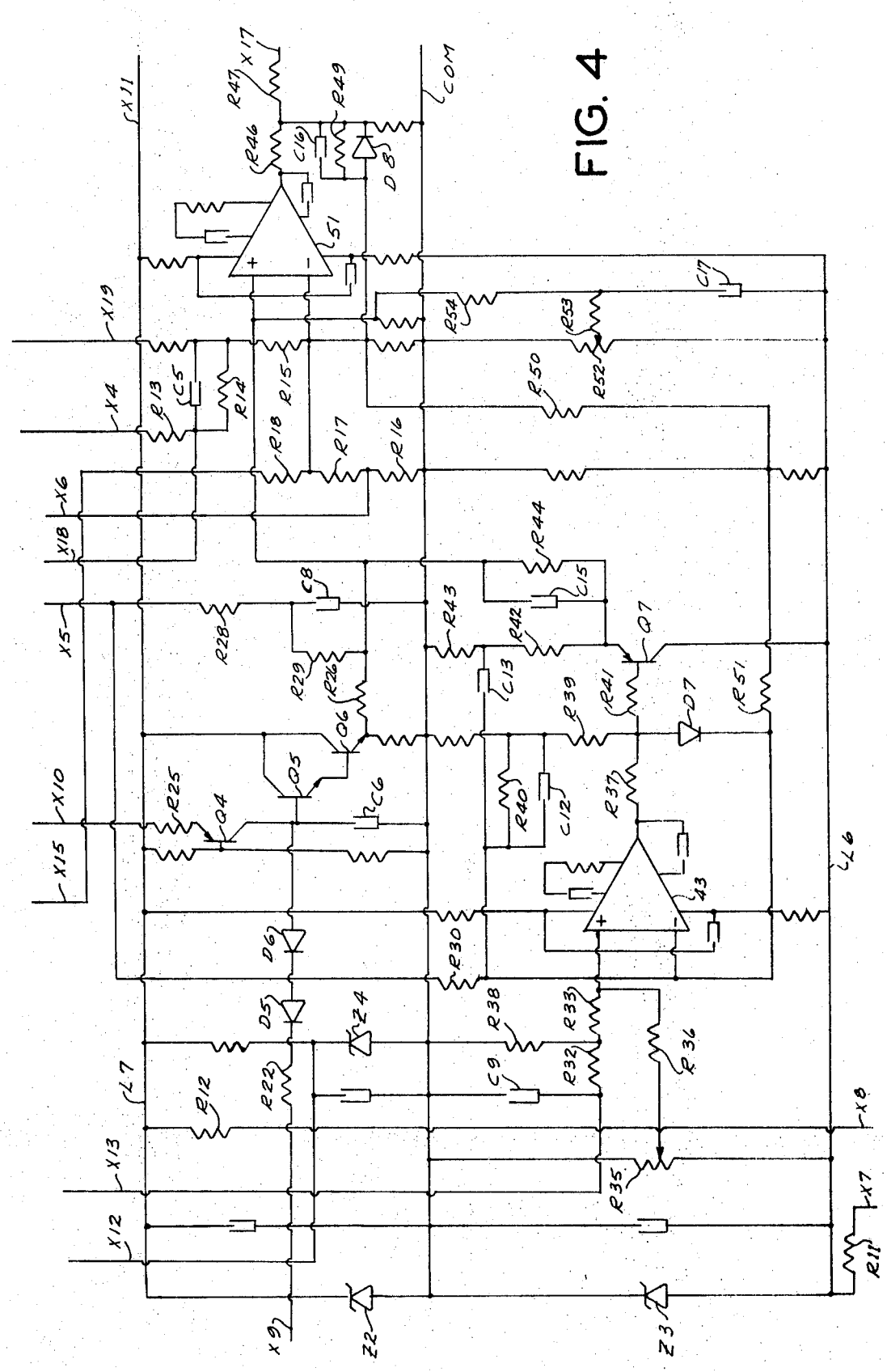
FIG. 4 is a schematic circuit diagram of control amplifier circuitry.

Triggering of the SCR's is carried out under the control of the control amplifier shown in detail in FIG. 4 in accordance with the various feedback signals described in connected with FIG. 1. The control amplifier serves to precisely determine the speed of the motor and, in addition, serves an important additional function in preventing the motor armature current from exceeding a preselected maximum. Since the motor torque is a function of the armature current, limiting the armature current also protectively limits the motor torque. As the block diagram of FIG. 1 suggests, the speed control and current control functions of the control amplifier are interconnected such that the current control circuitry is inoperative so long as the armature current does not exceed the preselected maximum. As this current maximum begins to be exceeded, the speed control circuitry is employed as a subordinate system to prevent the current from substantially exceeding the maximum. The current limit is accomplished by current control wherein the current feedback loop is the major control loop of the system.

Before a clear understanding of the control amplifier can be had, it is necessary first to examine certain peripheral circuitry, including portions of the feedback circuits.

As was explained in connection with FIG. 1, a voltage feedback circuit 19 is provided which senses the DC voltage $E_o$ supplied by this power circuit to the motor armature 11A and which produces a degenerative feedback signal varying as a function of this voltage. This voltage is provided to the control amplifier by a lead X4 including a resistor R6 connected from conductor L4 to the control amplifier as represented by dashed lines in FIG. 2. This output voltage $E_o$ is measured with respect to conductor L5, which provides a common reference for all of the circuitry of this invention. For this purpose, a circuit common connection COM is made from conductor L5 to the control amplifier, the phase shifter and pulse generator circuitry and the power supply and phase sequence protection circuitry.

An armature current feedback connection to the control amplifier circuitry is made by means of a lead X5 including a resistor R7 connected to one side of resistor R1. When current is flowing through the power loop, i.e., through motor armature 11A, a voltage is developed across resistor R1 which is equal to the product of the current therethrough times the resistance and this voltage, when fed back, provides a feedback signal proportional to the motor armature current.

At TAC is indicated a tachometer generator which is suitably mechanically interconnected with the motor and load so that it is driven thereby. The use of the tachometer generator is optional but, when provided, provides very precise control over the speed of the drive motor. The tachometer generator is electrically connected in series with a resistance R8 and its output is supplied to the control amplifier circuitry by means of a connection X6. One side of the tachometer generator is connected to the common lead COM. A rheostat-connected potentiometer R9 and resistor R10 are connected in parallel across tachometer generator TAC and resistor R8 to shunt current from lead X6 to the circuit common COM in order to provide means for limiting the maximum speed of the motor.

Power is supplied to the control amplifier circuitry by a pair of leads X7 and X8 connected to the power supply and phase sequence protection circuitry, which is explained hereinbelow. Leads X7 and X8 supply suitable voltages, e.g., −24 VDC and +24 VDC, respectively, with respect to the circuit common COM. Referring now to FIG. 4 the −24 VDC provided by lead X7 is supplied through a resistor R11 to a conductor L6 and the +24 VDC provided by lead X8 is supplied through a resistor R12 to a conductor L7. Zener diodes Z2 and Z3 connected between leads L7 and L6, respectively, and the circuit common COM regulate the voltage on leads L7 and L6 to approximately +15 VDC and −15 VDC, respectively, with respect to the common COM. The voltages on leads L6 and L7 supply power for the various circuit components of the control amplifier in conventional fashion. In the interests of clarity of illustration and ease of understanding, discussion or designation with reference characters of the various other power supply components such as biasing or current limiting resistors and smoothing or noise-filtering capacitors employed in conventional manner has been omitted throughout the remainder of the specification except where necessary to aid in understanding the invention.

The armature voltage feedback signal provided by lead X4 is supplied through three resistors R13, R14 and R15 to the inverting input of the voltage control amplifier 51. Amplifier 51 is a high gain differential operational amplifier, i.e., voltage comparator, such as is commercially available from a number of sources. Its output varies as a function of the algebraic sum of the voltages applied to its inverting and noninverting inputs, which are designated with minus and plus signs, respectively. A capacitor C5 is connected across resistor R14 and, by differentiating the voltage signal at the junction of resistors R13 and R14, supplies a signal through resistor R15 to the inverting terminal of amplifier 51. THe signal thus supplied is, in effect, the rate of change of the voltage supplied to the armature, $E_o$. In this way, the acceleration feedback circuit 21 indicated in the block diagram of FIG. 1 is provided. It should be apparent that the acceleration feedback circuit 21 is used for phase compensation to provide stability to the system. The tachometer generator output provided by tachometer feedback connection X6 is supplied to the junction of a pair of resistors R16 and R17 constituting, with a resistor R18, a voltage divider network. The inverting input of amplifier 51 is connected to the junction of resistors R17 and R18. This circuitry provides the tachometer generator feedback circuit indicated at 23 in FIG. 1. It should be noted that, if tachometer generator feedback is employed, it supplies the majority of the speed control feedback, as compared with the armature voltage ($E_o$) feedback.

Referring now for the moment to FIG. 2, and particularly to the left of the control amplifier as represented in dashed-line form, a potentiometer R19 permits preselection of the run speed of the drive motor. Its tap provides a reference voltage serving as the speed reference signal and which is supplied through a pair of normally open contacts CR1A, when the contacts are closed, through a lead X9 to the control amplifier. A Zener diode Z4 (FIG. 4) interconnected with conductor L7 provides a regulated voltage, e.g., +9 VDC, across potentiometer R19 through a lead X12. Potentiometer R19 is paralleled by a series-connected resistor R20 and potentiometer R21, the tap of potentiometer R21 being connected to the circuit common COM. Potentiometer R21 determines the minimum motor speed by shifting the level of the potentiometer with respect to the circuit common. A pair of normally closed contacts CR1B shunts the tap of potentiometer R21 and lead X9. Contacts CR1A are closed and contacts CR1B are opened under the control of the start-stop circuitry shown in detail in FIG. 3 when it is desired to accelerate the motor to its running speed. The operation of the start-stop control is discussed in detail hereinbelow.

Referring now again to FIG. 4, the reference voltage provided by lead X9 is supplied through a series-connected resistor R22 and a pair of diodes D5 and D6 to the collector of a PNP transistor Q4. This transistor is part of an acceleration circuit which also includes a Darlington-coupled pair of NPN transistors Q5 and Q6. Transistor Q4 is a constant-current generator provided for charging a capacitor C6 connected between its collector and the circuit common COM at a constant rate to the speed reference voltage determined by potentiometer R19. The rate at which transistor Q4 charges capacitor C6 is determined by the setting of a rheostat-connected potentiometer R24 (FIG. 2) connected by means of a lead X10 in a series circuit with a resistor R25 between the emitter of transistor Q4 and a lead X11 and the rate at which capacitor C6 charges is proportional to the charging current. The voltage to which capacitor C6 is charged is applied to the base of transistor Q5. Because of the emitter-follower configuration of the Darlington-coupled pair of transistors Q5 and Q6, the voltage at the emitter of transistor Q6 closely approximates the capacitor voltage thus applied to the base of transistor Q5. Diodes D5 and D6 provide compensation for the base-emitter offset voltage of transistors Q5 and Q6. The voltage at the emitter of transistor Q6 is applied through a resistor R26 to the noninverting input of amplifier 51. THe acceleration circuit thus described provides means for accelerating the drive motor at a substantially constant rate to the preselected motor speed as determined by the tap setting of potentiometer R19. The current signal represented by the voltage developed across resistor R1 and made available to the control amplifier through lead X5 is supplied through a resistor R28 to a capacitor C8 which provides means for integrating the current signal. The integrated or delayed signal on capacitor C8 is provided through a resistor R29 to the noninverting input of the voltage control amplifier 51. This circuit thus serves as a delay network responsive to the voltage developed across resistor R1 and, by virtue of the connection to the noninverting input of amplifier 51, provides a regenerative delayed feedback signal which varies as a function of the motor armature current for IR compensation. This delayed feedback is used in conjunction with the degenerative feedback circuit 39 to provide for IR compensation which is necessary to compensate for the voltage drop in the motor due to motor armature resistance and reactance. A potentiometer R45 is connected between the circuit common COM and lead X5. The tap of potentiometer R45 is connected through a lead X15 to one side of resistor R18 so that a compensating feedback signal is supplied to the inverting input of amplifier 51. The armature current signal is also made available to the current control amplifier 43 by means of a connection including a resistor R30 interconnecting lead X5 with the inverting input of amplifier 43 to provide a current control feedback signal. The amount of this feedback is adjustably determined by a rheostat-connected potentiometer R23 (FIG. 2) connected from the top of resistor R7 and in series with a resistor R27 to the common COM.

The armature current reference signal is made available to amplifier 43 for current control purposes by a circuit including a potentiometer R31 connected between lead X12 and the circuit common COM. The tap of this potentiometer is connected to a resistor R34. A lead X13 supplies the reference voltage determined by the tap through a pair of resistors R32 and R33 to the noninverting input of the current control amplifier 43. Potentiometer R31 thus provides means for producing a reference voltage proportional to a preselected maximum armature current. Amplifier 43 is, like voltage control amplifier 51, a high gain differential operational amplifier which supplies an output voltage which is a function of the algebraic sum of the voltages applied to its input terminals. A diode D7 is connected from the output of amplifier 43 to its inverting input terminal to prevent its output from becoming positive. As a result, the output voltage of amplifier 43 varies as a function of the voltage by which the current feedback signal provided to the inverting input of the amplifier exceeds the reference voltage determined by the setting of the tap of potentiometer R31 and applied to the noninverting input of the amplifier. A bias circuit is also connected to the noninverting input of amplifier 43 for the purpose of zeroing the output of amplifier 43 when no current is flowing through resistor R1. This bias circuit includes a potentiometer R35 connected between line L6 and the circuit common COM, its tap being connected through a resistor R36 to the noninverting input of amplifier 43. The amplifier is provided with a high-frequency noise suppression circuit including a capacitor C9 connected between lead X13 and the circuit common COM and a resistor R38 connected between the junction of resistors R32 and R33 and the circuit common.

A degenerative feedback circuit is provided for controlling the gain and stability of amplifier 43 and includes a resistor R39 and a parallel RC circuit including a resistor R40 and capacitor C12 interconnecting the output of amplifier 43 with its inverting input terminal. This circuit provides a gain adjustment as well as a high-frequency rolloff of the response of the amplifier for stability purposes. The output of amplifier 43 is supplied through resistors R37 and R41 to the base of a PNP transistor Q7 connected in emitter-follower configuration. The emitter circuit of transistor Q7 includes a series-connected pair of resistors R42 and R43 connecting the emitter to the circuit common COM. A capacitor C13 is connected from the junction of resistors R42 and R43 to the inverting input of amplifier 43 to provide feedback for controlling the frequency response of amplifier 43. Thus, degenerative feedback for amplifier 43 is provided by both capacitor C13 and by the RC circuit including resistor R40 and capacitor C12. Since transistor Q7 inherently introduces a degree of time lag into the overall response of amplifier 43, the degenerative feedback provided by capacitor C13 is delayed accordingly. Therefore, capacitor C12 is employed to provide a somewhat quicker degenerative feedback by virtue of its direct connection from the output of amplifier 43 to the inverting input thereof and thus provides the amplifier 43 with enhanced stability by anticipating changes in the armature current and accordingly applying a degenerative feedback to minimize current overshoot. The capacitor C12 provides for a fast response time of 5 milliseconds and eliminates the need for instantaneous overcurrent trip circuits. The voltage at the emitter of transistor Q7 substantially follows the voltage applied to its base. This voltage on the emitter is applied through a phase compensation circuit including a parallel-connected capacitor C15 and a resistor R44 to the noninverting input of amplifier 51 as a degenerative control signal varying as a function of the voltage by which the current feedback signal exceeds the current reference voltage. This voltage causes the SCR to phase back to maintain the armature current at a present level, even at stall speeds. This is possible only when current control is used.

The output of amplifier 51 is supplied as a control signal through a pair of resistors R46 and R47 to the phase shifter and pulse generator by means of a connection X17. A parallel-connected capacitor C16 and resistor R49 are connected from the junction of resistors R46 and R47 to the inverting input of amplifier 51. This degenerative feedback circuit provides means for controlling the gain and overall frequency response of the control amplifier circuitry described thus far. It determines the high-frequency rolloff of the entire amplifier circuitry and sets its frequency response such that it is cut off at a desired frequency, e.g., 13 Hz. The inverting inputs of each of amplifiers 51 and 43 is biased through respective biasing resistors R50 and R51. A diode D8 connected in parallel with capacitor C16 and resistor R49 clamps the output of amplifier 51 to prevent it from becoming negative. Amplifier 51 is also provided with a bias network for zeroing the output when there is zero armature current and zero armature voltage feedback. This circuit includes a potentiometer R52 connected between lines L6 and the circuit common COM, its tap being connected by means of resistors R53 and R54 to the noninverting input of amplifier 51 to compensate for any offset voltage of the amplifier. A capacitor C17 is connected from the junction of resistors R53 and R54 to introduce a time delay during which capacitor C17 will charge and thus to insure that, when the system is initially supplied with power, amplifier 51 will initially have a zero output. As is explained hereinafter, this prevents the SCR's from delivering any appreciable power when the control is first switched on.

Start-Stop Control

Figures 3, 5:
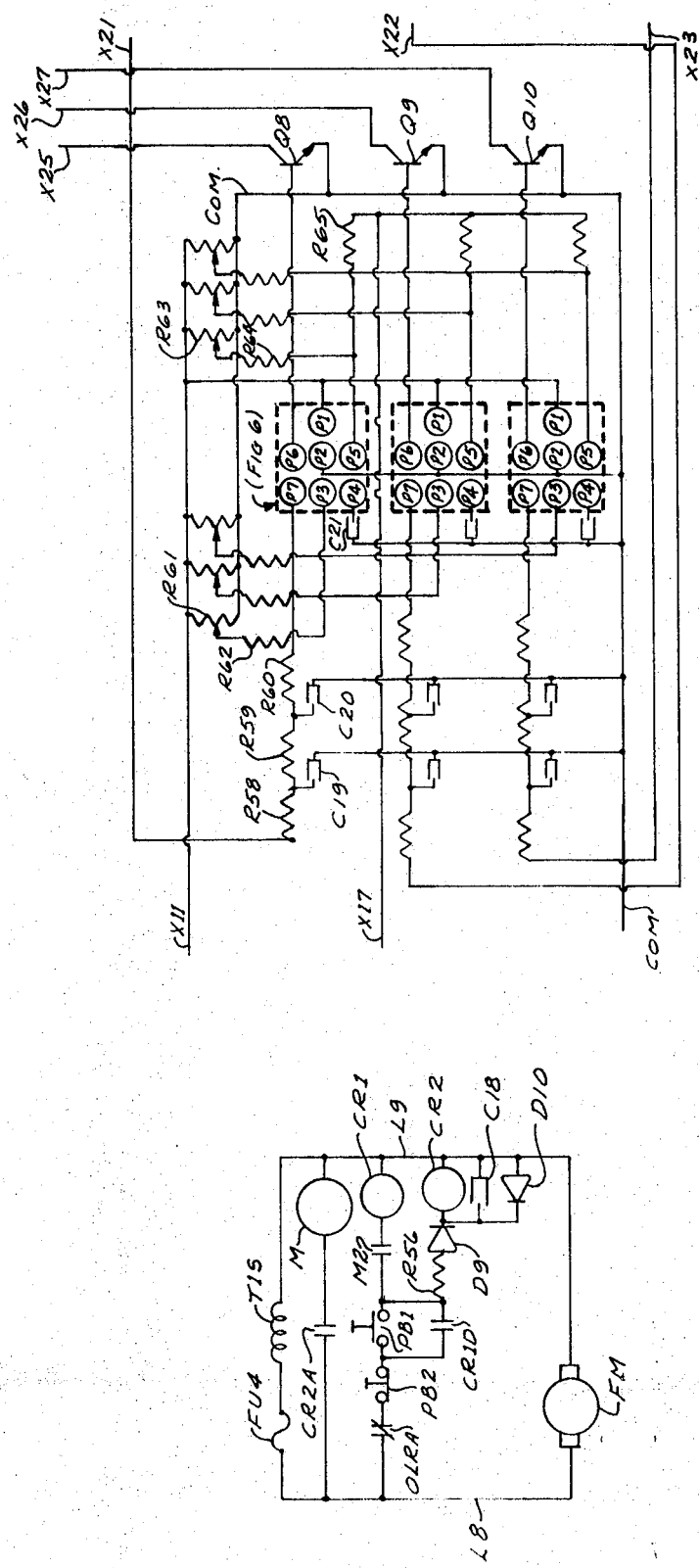
FIG. 3 is a schematic circuit diagram of start-stop control circuitry including manually operated means for controlling the apparatus of FIG. 2.
FIG. 5 is a schematic circuit diagram of phase shifter and pulse generator circuitry.

FIG. 3 illustrates start-stop control circuitry of the present invention which is used as a manually operated controller in conjunction with the control amplifier of FIG. 4 to cause the drive motor to be started and to accelerate to a speed as determined by the setting of potentiometer R19 or to stop the motor. Power is supplied to the circuit by the secondary winding T1S of transformer T1 which applies a voltage through a fuse FU4 across a pair of leads L8 and L9. A fan motor FM is adapted to be energized by the voltage across lines L8 and L9 to supply cooling air to the heat sinks of SCR's Q1–Q3. The normally open contacts of pushbutton start switch PB1 are connected in a series circuit with the normally closed contacts of a push button stop switch PB2 and a normally closed pair of contacts OLRA adapted to open if the overload relay OLR (FIG. 2) is operated through overload of the drive motor. This series push button switch circuit also includes a pair of normally open contacts M2 of a magnetic contactor and the coil of a relay CR1. A pair of normally open contacts CR1D controlled by the energization of relay winding CR1 is connected in parallel across push button switch PB1 to provide a latching circuit when the contacts are closed. A series circuit including a resistor R56, a diode D9 and the winding of a relay CR2 interconnects one side of the switch PB1 to lead L9 for energizing winding CR2 when either the contacts of switch PB1 or relay contacts CR1D are closed. A capacitor C18 and a conventional half-back diode D10 for suppressing inductively induced transients in winding CR2 are connected in parallel thereacross. Also connected across leads L8 and L9 is a series circuit including a pair of normally open contacts CR2A operated by energization of relay winding CR2 and the winding M of the magnetic contactor which includes contacts M1 (FIG. 2) and M2. Relay winding CR2 is adapted to control contacts CR1A (shown in FIG. 2 in connection with the control amplifier) such that contacts CR1A are closed and contacts CR1B and CR1C are opened when winding CR2 is energized. The present start-stop circuit is operative in conjunction with the control amplifier to provide control over the triggering of SCR's s Q1–Q3 such that contactor winding M is energized prior to controlling triggering of the SCR's in a sense to cause them to supply DC power to the motor when it is desired to accelerate the motor from stopped to the preselected run speed and to cause triggering of the SCR's in a sense to cease supplying DC power prior to deenergizing contactor winding M when it is desired to stop the motor while it is running. This has the purpose of preventing current from flowing through the contactor contacts M1 at the time they are closed and opened, thereby preventing arcing thereacross to prevent them from becoming pitted or burned.

Phase Shifter and Pulse Generator

Figure 6:
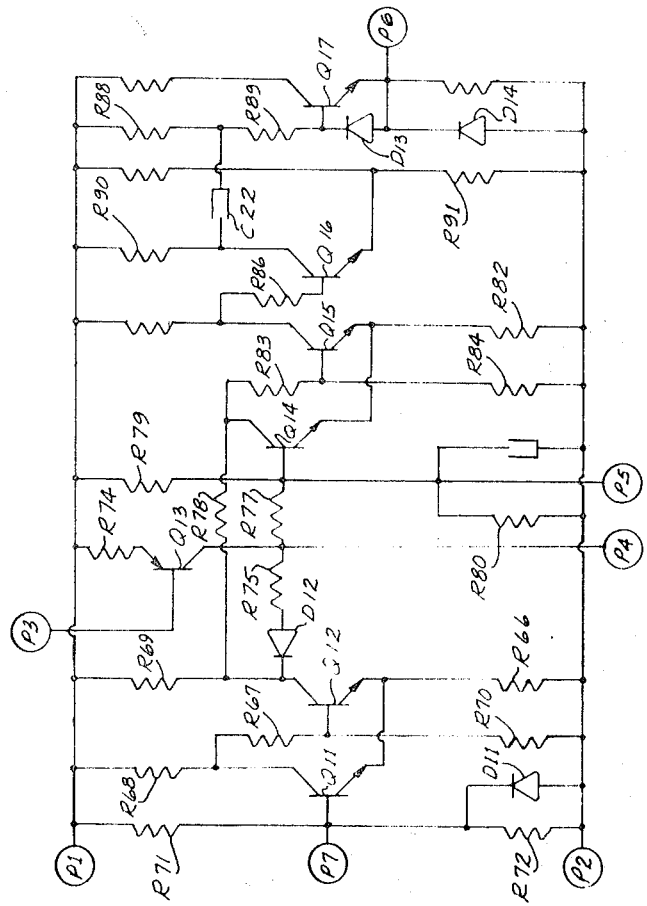
FIG. 6 is a schematic circuit diagram of one of three identical subassemblies employed in the circuit of FIG. 5.

FIGS. 5 and 6 illustrate phase shifter and pulse generator circuitry of the present invention, FIG. 6 illustrating one of three identical subassemblies employed in the circuit of FIG. 5, each such subassembly having pin connections P1-P7 by which each of the three circuits is interconnected with the circuit of FIG. 5. FIG. 5 illustrates diagrammatically three dashed-line rectangles each having pin jack connections also designated P1-P7 and corresponding with the pin connections of FIG. 6. These circuits are responsive to the triggering control signal made available thereto by connection X17 from the control amplifier of FIG. 4 and are operative to generate three sequential pulsed switch functions for triggering respective ones of the three SCR's in conjunction with the gate driver circuitry of FIG. 7. The AC waveform applied across any one of the SCR's differs in phase by 120° of the AC cycle with respect to the waveform across any other SCR and, accordingly, the triggering pulses generated by the present circuitry are separated from each other by a time period corresponding with this 120° phase difference. With respect to the waveform of the AC voltage applied across any one of the SCR's, the present circuitry is operative to shift the triggering pulse from exactly the half-wave point (i.e., 180° of the cycle) back over 150° of the positive half-cycle of the applied sinusoidal voltage. In this manner, the phase of triggering of each of the SCR's is varied.

Power for the circuit of FIG. 5, and thereby each of the circuits represented by FIG. 6, is supplied by means of the connections X11 and the circuit common COM. A line synchronization voltage is supplied by means of leads X21, X22 and X23 from the respective secondary windings T2S, T3S and T4S, at a suitable voltage, e.g., of 36 VAC. Since the phase shifter and pulse generator circuitry actually comprises three identical circuits, only one such circuit will be explained and only the components of that circuit will be designated with reference characters. Taking the uppermost circuit within the schematic diagram of FIG. 5 for purposes of explanation, line synchronization voltage is supplied by lead X21 to a high-frequency filter including series-connected resistors R58, R59 and R60, a capacitor C19 connected from the junction of resistors R58 and R59 to the circuit common COM and a similar capacitor C20 connected from the junction of resistors R59 and R60 to the common. This RC filter circuit filters out any high-frequency transients on the line synchronization voltage input so that a "clean" 60 Hz. synchronization signal is applied through resistor R60 to pin P7. In addition, the RC network delays the synchronous input to extend the triggering range to accommodate requirements of four quadrant regenerative systems. A potentiometer R61 is connected across lead X11 and the circuit common COM. Its tap is connected through resistor R62 to pin P3, the position of the tap determining the voltage supplied to P3 for a purpose which will become apparent. A capacitor C21 is connected between pin P4 and the circuit common COM. Lead X11 is directly connected to pin P1. Pin P2 is directly connected to the circuit common COM. Another potentiometer R63 is also connected lead X11 and the circuit common and its tap is connected through a resistor R64 to pin P5. The triggering control signal applied through lead X17 is also supplied to pin P5 through a resistor R65. Pin P6 provides an output terminal for the FIG. 6 circuitry and this pin is directly connected to the base of an NPN transistor Q8 whose emitter is connected to the circuit common and whose collector is connected to the gate driver circuitry of FIG. 7 by means of a lead X25. Each of the other two of the three identical circuits includes a similar output transistor Q9 and Q10, each having its collector connected to the gate driver circuitry by respective connections X26 and X27.

Referring now to FIG. 6, a pair of NPN transistors Q11 and Q12 are connected in a Schmitt trigger circuit, the emitters of transistors Q11 and Q12 being commonly connected through a resistor R66 to pin P2 which is connected to the circuit common COM. A resistor R67 interconnects the collector of transistor Q11 and the base of transistor Q12 such that, when transistor Q11 is conductive, transistor Q12 is nonconductive and vice versa. A load resistor R68 interconnects the collector of transistor Q11 and pin P1 and a similar resistor R69 is provided for transistor Q12. The base of transistor Q12 is biased to the circuit common by a resistor R70. Transistor Q11 is biased by means of biasing resistors R71 and R72 to a point just below conduction. A diode D11 connected across resistor R72 limits reverse biasing of transistor Q11. During the positive half-cycle of the line synchronization voltage, transistor Q11 is forward biased and thereby conducts. During the negative half-cycle of this voltage, transistor Q11 is reverse biased, and thus the transistor alternates between conduction and nonconduction in phase with the line synchronization voltage. Since the potential at the collector of transistor Q11 provides the bias to transistor Q12, the latter is quickly switched between its conductive and nonconductive states and the voltage at its collector is an inversion of the waveform on the collector of transistor Q11.

A PNP transistor Q13 has its emitter connected to pin P1 through a resistor R74. Its collector, which is connected to capacitor C21 by means of pin connection P4, provides means for charging capacitor C21 at a substantially constant current, the rate of charge being dependent upon the setting of the tap of potentiometer R61. If charged, then, by transistor Q13, capacitor C21 exhibits a voltage increasing substantially according to a ramp characteristic, the slope of the ramp being determined by the setting of the tap of potentiometer R61. However, capacitor C21 is also connected to the collector of transistor Q12 through a diode D12 and a resistor R75 and thus, on negative half-cycle when transistor Q12 is conductive, capacitor C21 is discharged. The voltage on capacitor C21 therefore varies substantially according to a saw tooth characteristic which increases linearly during the positive half-cycle of the line synchronization voltage, when transistor Q12 is nonconductive, because of the constant charging current supplied thereto by transistor Q13 and then decreases rapidly upon conduction of transistor Q12 at the half-wavelength point and remains at a negligibly low voltage for the negative half-cycle of the line synchronization voltage while transistor Q12 is conductive. Diode D12 prevents any contribution to the charging current when the collector of transistor Q12 is at a high potential.

The saw tooth voltage characteristic across capacitor C21 is applied through a resistor R77 to the base of an NPN transistor Q14 whose collector is tied by a resistor R78 to the collector of transistor Q12 so that the former follows the voltage on the latter. Also applied to the base of transistor Q14 by means of pin connection P5 are the bias voltage provided by potentiometer R63 and the triggering control signal supplied through resistor R65. A pair of biasing resistors R79 and R80 bias transistor Q14 such that, if no triggering control signal were supplied from the control amplifier, transistor Q14 would be biased into conduction very near the completion of the ramp voltage present on capacitor C21, i.e., very near the end of the positive half-cycle of the line synchronization voltage. Thus, even when no triggering control signal is supplied, the SCR's are triggered, but substantially at the voltage applied across them. Triggering pulses are thus always present resulting in smoothness of control and, as those skilled in the art will understand, to insure commutation of the SCR's when used in regenerative drive applications. As the triggering control signal supplied by the control amplifier increases in magnitude, the threshold at which transistor Q14 is biased into conduction is achieved earlier in the half-cycle. Since the collector of transistor Q14 is derived from the collector of transistor Q12, it must switch to a low value during the negative half-cycle.

Transistor Q14 together with another NPN transistor Q15 forms a second Schmitt trigger circuit, the emitter of transistor Q14 being tied to the emitter of transistor Q15 and coupled through a common emitter resistor R82 which provides the regenerative feedback between the two transistors which provides the rapid switching characteristic typical of the Schmitt trigger circuit. A resistor R83 interconnects the collector of transistor Q14 and the base of transistor Q15 and a resistor R84 biases the base of transistor Q15 to the circuit common COM. When transistor Q14 becomes conductive, thus triggering the second Schmitt circuit according to the mechanism just described, transistor Q15, normally conductive, becomes nonconductive. Another NPN transistor Q16 has its base tied through a resistor R86 to the collector of transistor Q15, such that when the latter is nonconductive, transistor Q16 is biased into conduction. Thus the collector potential of transistor Q16 is high until transistor Q14 is biased on at threshold in the manner previously described.

Transistor Q16 and another NPN transistor Q17 form a monostable multivibrator i.e., a so-called one-shot switching circuit. A biasing circuit including a pair of resistors R88 and R89 normally biases transistor Q17 into conduction. The collector of transistor Q16, to which the supply voltage is provided by means of a resistor R90, is connected through a capacitor C22 to the junction of resistors R88 and R89. When the collector of transistor R88 and R89. When the collector of transistor Q16 is at a high potential, capacitor C22 is charged such that its electrode connected to the collector of transistor Q16 is positive. A pair of diodes D13 and D14 is connected from the base of transistor Q17 to the circuit common. When transistor Q14 becomes conductive in the manner described above and thus also transistor Q16 conducts, the drop of its collector potential causes capacitor C22 to discharge through transistor Q16, a resistor R91 connected between its emitter and the circuit common, diodes D13 and D14 and resistor R89. This reverse biases the base of transistor Q17 to approximately $-1.2$ volts determined by the forward drop of diodes D13 and D14. As the charge on capacitor C22 is depleted, the capacitor charges in reverse polarity to the inherent positive potential of the base of transistor Q17. Since transistor Q17 is biased off by the reverse pulse thus generated at its base, its emitter potential goes from a normal positive value of approximately 0.6 volts to a negative 0.6 volts and then recovers as conduction of the transistor returns. Thus a negative pulse is provided at the emitter of transistor Q17 upon triggering of the second Schmitt circuit at a phase angle within the positive half-cycle of the line synchronization voltage as determined by the triggering control signal supplied by the control amplifier. By means of pin connection P6, the emitter voltage of transistor Q17 is applied to the base of transistor Q8 to control its conduction. Each phase shifter and pulse generator circuit operates in the manner just described to provide a fixed duration (e.g., 300 microseconds), fixed amplitude pulse which is shifted within the positive half-cycle of its respective phase input as a function of the magnitude of the triggering control signals supplied from the control amplifier. The potentiometer of each of the circuits corresponding with potentiometer R61 is adjusted so that each of the three circuits shifts its output pulse by an equal phase angle for a given magnitude of the triggering control signal.

Gate Driver

Figure 7:
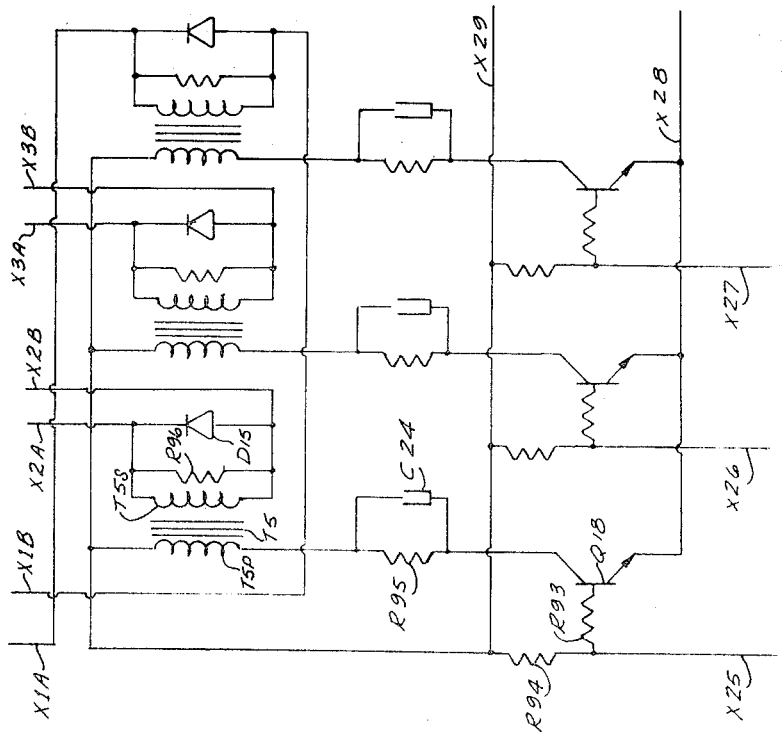
FIG. 7 is a schematic circuit diagram of a gate driver of the FIG. 2 apparatus.

Referring now to FIG. 7, the gate driver circuitry shown therein is adapted to supply triggering pulses to each of SCR's Q1–Q3 under the control of the phase shifter and pulse generator circuitry of FIGS. 5 and 6. Like the phase shifter and pulse generator circuitry, the gate driver is actually three individual gate driver circuits. In the interest of simplicity and clarity of illustration, only one of these circuits is described herein. Each of the three gate driver circuits is actually a so-called slave-type circuit and responds only when triggered by the respective output transistor Q8–Q10 of the phase shifter and pulse generator. The collector terminal of each of the latter transistors is connected by a respective lead X25–X27 for supplying its pulsed output to each such gate driver circuit.

Taking the first circuit of the gate driver as an example, lead X25 supplies the output of transistor Q8 (FIG. 5) through a resistor R93 to the base of an NPN transistor Q18 whose emitter is supplied with a potential of $+1$ VDC by means of a lead X28 from the power supply circuit and phase sequence protection circuitry which also supplies a $+24$ VDC potential by means of a connection X29. This potential is made available through a resistor R94 to lead X25. The potential thereon is supplied through resistor R93 and would tend to forward bias transistor Q18 if it were not for the fact that the output transistor Q8 of the phase shifter and pulse generator is normally conductive. This causes the junction of resistors R94 and R93 to be at the potential of the circuit common. As a result, the positive one volta potential applied to the emitter of transistor Q18 by means of lead X28 causes the transistor to be reverse biased. As was described previously, when transistor Q14 reaches threshold and thus triggers the second Schmitt circuit of the FIG. 6 circuit, a negative output pulse of predetermined duration and magnitude is applied to the base of transistor Q8 and, by virtue of the potential applied through lead X25 from the gate driver circuitry, this negative pulse has the effect of causing transistor Q8 to becomes nonconductive for the duration of the pulse, i.e., 300 microseconds. When this occurs, transistor Q18 is forward biased and is thus conductive for the duration of the pulse. The collector of transistor Q18 is connected in a circuit including a parallel RC combination constituted by a resistor R95 and a capacitor C24, the circuit being connected to one side of a primary winding T5P of a pulse transformer T5. The other side of the winding is supplied with $+24$ VDC by means of lead X29. Across the secondary winding T5S are a static load resistor R96 and a diode D15, the latter being employed to shunt the transient inductively induced in the secondary winding when the current in the primary winding ceases. When transistor Q18 is biased into conduction in the manner just described, current flows through the primary winding T5P to cause a strong pulse, e.g., of a magnitude of 20 volts, to be generated by the secondary winding T5S and this pulse is supplied by means of leads X2A and X2B to SCR Q2 for triggering thereof. Similar connections are made to SCR's Q1 and Q3. Capacitor C24 in the collector circuit of the transistor Q18 causes the current to rise more rapidly by effectively canceling the inductive reactance of the pulse transformer; and thus give a steeper rise to the output pulse. A resistor R95 provides current limiting after the overdrive period afforded by capacitor C24.

Power Supply and Phase Sequence Protection

Figure 8:
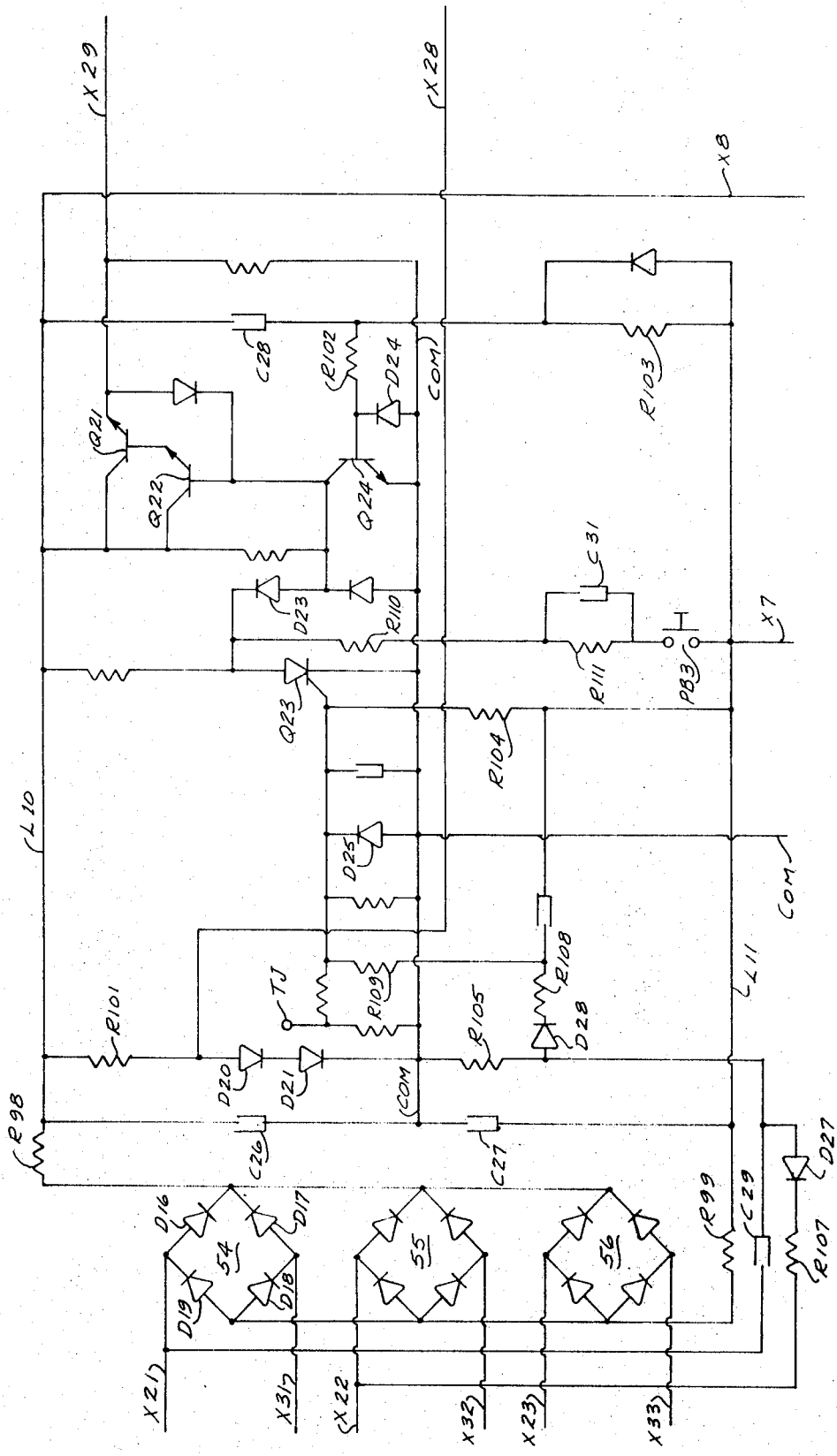
FIG. 8 is a schematic circuit diagram of power supply and phase sequence protection circuitry of the present invention.

The power supply and phase sequence protection circuitry of FIG. 8 is adapted to supply power at appropriate voltages to other circuitry of the invention and to prevent the SCR's Q1–Q3 from being triggered in the event that power leads L1–L3 are connected improperly to the three-phase AC source of power such that triggering of the SCR's would be out of sequence with respect to the phase of voltage applied thereacross. It should be understood that such out-of-sequence triggering of the SCR's would cause damage.

AC power for the circuit of FIG. 8 is provided by the secondary windings T2S, T3S and T4S and the voltage across these windings is supplied by means of pairs of leads X21 and X31, X22 and X32, and X23 and X33. Taking the pair of leads X21 and X31 as an example, the voltage across winding T2S is provided across a full-wave diode bridge 54 including diodes D16–D19. Similar bridges 55 and 56 are supplied with AC power by the other two pairs of leads. The bridges are paralleled to supply a potential of $+24$ VDC through a current-limiting resistor R98 to a conductor L10 and a potential of $-24$ VDC through a current-limiting resistor R99 to a conductor L11, these voltages being measured with respect to the circuit common COM. Respective filtering capacitors C26 and C27 are connected between conductors L10 and L11 and the circuit common COM. The $+24$ VDC and $-24$ VDC potentials are applied through connections X7 and X8 to the control amplifier. A circuit including a resistor R101 and a pair of diodes D20 and D21 is connected between line L10 and the circuit common, the forward drop across these diodes providing a positive 1 VDC potential which is supplied by means of lead X28 to the gate driver circuitry.

The phase sequence protection circuitry per se includes a transistor Q21, its collector being connected to a conductor L10 and its emitter being connected to line X29 to supply a positive 24 VDC potential to the gate driver circuitry when the transistor is conductive. Transistor Q21 is Darlington-connected with another NPN transistor Q22 such that conduction of the latter controls conduction of the former. The base of transistor Q22 is connected through a diode D23 to the anode of an SCR Q23 which controls the biasing of transistor Q22. The SCR is normally nonconductive but is adapted to be triggered to remove the bias on transistor Q22 and thus to cut off transistor Q21, depriving the gate circuitry of the positive 24 VDC potential applied thereto through lead X29 and thus to prevent triggering of the SCR's in the event that leads L1–L3 are improperly connected to the AC three-phase source to cause an incorrect phase rotation sequence. A transistor Q24 is provided for delaying the supply of this 24 volt potential to the gate driver upon initial application of control power for a time sufficient to allow a sampling of the phase sequence by the present circuitry to take place. Transistor Q24 has its collector and emitter terminals connected between the base of transistor Q22 and the circuit common COM. At the moment power is applied to the apparatus and a positive 24 volt potential appears on conductor L10, transistor Q24 conducts by virtue of the forward bias supplied through a capacitor C28 and a resistor R102 interconnecting its base and conductor L10. Conduction of transistor Q24 prevents transistor Q22 from being biased into conduction for a time until capacitor C28 charges such that the base of transistor Q24 is driven negative by virtue of current flowing through a diode D24 interconnecting its base and emitter terminals, resistor R102, and a resistor R103 interconnecting the junction of resistor R102 and capacitor C28 and line L11. As conduction of transistor Q24 ceases, its collector becomes positive, forward biasing transistors Q22 and Q21, thus to supply positive 24 VDC to the gate driver. However, should SCR Q23 be triggered, the forward bias supplied to transistor Q22 is shunted to the circuit common, thus causing transistor Q22 to cease conduction, consequently preventing power from being supplied by line X29 to the gate driver.

Triggering of SCR Q23 is controlled by a circuit including a resistor R104 interconnecting the gate or triggering terminal of the SCR with line L11. A diode D25 is provided from the gate terminal of the SCR to the circuit common and this applies a −0.5 volt potential to the SCR. The SCR remains nonconductive until this negative 0.5 volt potential is exceeded as is the case in the event of improper phase rotation sequence, as will be seen, thereby causing triggering of the SCR.

It should be understood that the desired or proper phase rotation sequence is such that the AC sinusoidal voltage across leads X22 and X32 lags by 120° the AC voltage across leads X21 and X31 and the voltage across leads X23 and X33 lags by 120° the voltage across leads X22 and X32. To sense the phase rotation sequence, a capacitor C29 and a resistor R105 are series connected between line X21 and the circuit common. A series-connected resistor R107 and a diode D27 are connected from lead X22 to the junction of capacitor C29 and resistor R105. The current supplied by the connection from lead X21 leads the applied voltage by 30° because of capacitor C29 and resistor R105. The current supplied to resistor R105 by the connection from lead X22 lags the applied voltage by 30° because of parallel loading of resistors R107, R105 and capacitor C29. The positive half-cycle of the voltage which would be applied across resistor R105 through the connection to lead X22 is clipped by diode D27. The positive half-cycle of the voltage that would be applied to this resistor by the connection to lead X21 is cancelled by the negative half-cycle of the voltage supplied by the connection to lead X22. The composite voltage which thus results across resistor R105 has an average negative value and this is applied through a diode D28 and resistors R108 and R109 to the gate terminal of SCR Q23, which therefore remains nonconductive.

However, if an incorrect phase sequence should occur as a result of an improper connection of lines L1–L3, the potential across leads X22 and X32 would lead the potential across leads X21 and X31 rather than lag it. In this event, the potential across resistor R105 would have a net positive value rather than a negative value and hence SCR Q23 would be triggered, cutting off the forward bias to transistor Q22 and thus preventing power from being supplied by means of lead X29 to the gate driver circuitry. In this way, means is provided for preventing triggering of the SCR's if the power bridge is connected for energization of the SCR's with improper phase rotation sequence.

If SCR Q23 is triggered because of improper phase rotation sequence, it remains conductive until power to the control is terminated.

It will be appreciated that the present protection circuit may also be used for preventing triggering of SCR's Q1–Q3 in the event of some other malfunction in an application of the DC drive of this invention. For this purpose, an external trip jack TJ is provided so that a positive signal applied thereto will trigger SCR Q3 and thus terminate the supply of the 24 volt potential to the gate driver circuitry, protectively preventing triggering of SCR's Q1–Q3. However, a reset pushbutton switch PB3 is also provided for causing the SCR to cease conduction. Switch PB3 is connected in a series circuit between the anode of SCR Q23 and conductor L11. This circuit includes a resistor R110, and a parallel-connected resistor R111 and a capacitor C31 such that, when switch PB3 is momentarily closed, capacitor C31 supplies a strong negative commutating pulse to the anode of the SCR, causing it to cease conduction and thus resetting the protection circuit. It should be further appreciated that the phase sequence protection circuit cannot be overridden by the reset circuits by virtue of the steady positive gate voltage at SCR Q23 at the time of a phase sequence fault. This insures that protection afforded by this circuit is not defeated by the reset circuits.

Operation

With the foregoing explanation of the circuits and other features of a DC controlled-velocity drive of the present invention providing a basis for an understanding of its various elements and their operation, the overall operation of the drive may now be readily understood.

In considering the operation of the drive, it is assumed that power leads L1–L3 are properly connected to the AC power source such that the phase sequence protection circuit will permit triggering of SCR's Q1–Q3. Switch SW1 is closed and power is thus provided across the SCR's. The various potentiometers employed in connection with the control amplifier, e.g., the acceleration rate potentiometer R24, the maximum and minimum speed potentiometers R9 and R21, and the current limit control potentiometer R31, are each appropriately set. For example, the current limit control potentiometer R31 is adjusted to preselect a desired percentage of the rated motor armature current (e.g., from 0 to 150percent) which is to be established as a maximum. Finally, potentiometer R19 is adjusted to preselect a desired motor speed.

With the control thus readied for operation, push button start switch PB1 is momentarily depressed for causing the drive motor to be accelerated to the preselected run speed. Closing of switch PB1 supplies power through a resistor R56 and diode D9 to energize relay coil CR2, thereby causing contacts CR2A to close. This in turn supplies power to the magnetic contactor coil M. Its energization closes the contacts M1 in the drive motor power circuit in order to connect the motor armature for energization. This also closes contacts M2 to supply power to relay coil CR1. Energization of coil CR1 closes contacts CR1A and CR1D and opens contacts CR1B and contacts CR1C. The closing of contacts CR1D completes a circuit around the contacts of switch PB1 and thus provides a latching or holding circuit for energization of relay coil CR2.

It will be appreciated that, as long as contacts CR1A are open and contacts CB1B are closed, the tap of run speed potentiometer R19 is disconnected and the reference voltage input lead X9 is connected directly to the circuit common and thus no potential is applied to the acceleration circuit of the control amplifier to charge capacitor C6. As a result, no potential is applied to the noninverting input terminal of amplifier 51 and the latter therefore has a zero output. With no output, no triggering control signal is supplied to the phase shifter and pulse generator circuitry. Accordingly, SCR's Q1–Q3 are each supplied with triggering pulses which are 180° out-of-phase with respect to the AC power applied across each, and thus supply substantially no power to the motor. However, when contacts CR1A close upon energization of relay coil CR1, capacitor C6 is permitted to charge at a constant rate determined by the setting of acceleration rate potentiometer R24 and the output of amplifier 51 thus increases linearly to supply an increasing triggering control signal to the phase shifter and pulse generator. The latter is operative to supply triggering pulses to the SCR's with a constantly increasing firing or triggering angle. The triggering pulses are supplied to the SCR's to cause each to be gated in sequence during the positive half-cycle of the AC waveform applied across its anode and cathode during which the SCR is forward biased. Thus DC current is supplied in sequence through each of diodes D1–D3 to the drive motor armature 11A. As the conduction angles of the SCR's are uniformly increased, a linearly increasing DC voltage ($E_o$) is supplied to the motor armature 11A. Thus the speed is increased with constant acceleration.

The tachometer generator feedback and armature voltage feedback circuits supply speed feedback signals to amplifier 51 which compares the motor speed feedback voltage applied to its inverting input terminal with the speed reference signal determined by the tap setting of potentiometer R19 until the motor reaches the preselected speed. The control then maintains the motor speed substantially equal to the preselected motor speed.

If, while the drive motor is running, the armature current begins to exceed the preselected maximum determined by the tap setting of potentiometer R31 (for example, where the load on the motor is greatly increased), then the current control amplifier 43 supplies a negative output voltage. This causes transistor Q7 to supply a degenerative current control signal to the noninverting input terminal of the speed control amplifier 51 which accordingly varies the triggering control signal supplied to the phase shifter and pulse generator to vary the phase of triggering of scr's Q1–Q3. The decrease in the firing angle which thus results, reduces the voltage $E_o$ supplied to the drive motor armature to substantially prevent the motor armature current from exceeding the preselected maximum. In this way, the motor armature is protected from excessive current and the motor is prevented from delivering excessive torque as well.

While the drive motor is running, the various feedback circuits described previously cause the control to respond rapidly in the event of any transient change in the motor load, such as might quickly change the speed of the motor. Because of these circuits, the drive is inherently stable to substantially all load conditions, and is substantially critically damped over the entire speed range of the drive. Significantly, the control need not be "tuned" to a particular application or load for stability. The provision of the optional tachometer generator TAC provided extremely close speed regulation, e.g., up to 0.1 percent regulation, as may be required, for example, in sectionalized paper drives.

If it is desired to bring the drive motor to a stop, the stop pushbutton PB2 is momentarily depressed. This opens the power circuit for relay coil CR2, as well as the power circuit for relay coil CR1 which is thereby immediately deenergized. However, because of capacitor C18 connected in parallel across relay coil CR2, this coil remains energized for a short period. When relay coil CR1 is deenergized, contact CR1A and contact CR1D are opened and contacts CR1B connects the speed reference input to the circuit common COM and the closing of contacts CR1C discharges capacitor C5. Accordingly, the output of amplifier 51 is immediately driven to zero to cause triggering of each of the SCR's Q1–Q3 to be "phased-back" to 180° of the AC voltage applied across each. Since relay coil CR2 remains momentarily energized as noted above, contacts CR2A remain momentarily closed and continue to energize magnetic contactor coil M so that contacts M1 in the power loop with the armature 11A of the drive motor remain closed. As a result, when contacts CR2A finally open the magnetic contactor coil M is deenergized, contacts M1 open at a time when power is not supplied to the motor armature, as in desirable to avoid pitting or erosion of the contacts.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In a controlled-velocity drive having a DC motor the speed of which varies substantially as a function of the voltage applied to the armature thereof, a control for the motor comprising:

a triggerable semiconductor current-switching device connected in a circuit, including an AC power source, for supplying a DC voltage to the motor armature when the switching device is triggered, shifting of the phase of triggering of the switching device causing variation of said DC voltage for varying the motor speed;

a first feedback circuit sensing said DC voltage applied to the motor armature and producing a first degenerative feedback signal;

a second feedback circuit sensing the rate of change of said DC voltage applied to the motor armature and producing a second degenerative feedback signal which varies as a function thereof;

a summing junction for summing said first and second feedback signals;

means for producing a reference voltage proportional to a preselected motor speed; and means, interconnecting said summing junction and said means for producing a reference voltage and responsive to the difference between said reference voltage and the sum of said feedback signals, for controlling the phase of triggering of said switching device to maintain the motor speed substantially equal to said preselected motor speed.

2. In a controlled-velocity drive as set forth in claim 1, said control further comprising a third feedback circuit, including a tachometer generator, for producing a third degenerative feedback signal varying according to the motor speed, said summing junction summing said third feedback signal with said first and second feedback signals.

3. In a controlled-velocity drive as set forth in claim 1, said control further comprising means, interconnected with said means for controlling the phase of triggering of said switching device for accelerating the motor at a substantially constant rate to said preselected motor speed.

4. In a controlled-velocity drive as set forth in claim 3, said means for accelerating the motor including a capacitor and means for charging the capacitor at a substantially constant current to said reference voltage.

5. In a controlled-velocity drive having a DC motor the speed of which varies substantially as a function of the voltage applied to the armature thereof, a control for the motor comprising:

a triggerable semiconductor current-switching device connected in a circuit, including an AC power source, for supplying a DC voltage to the motor armature when the switching device is triggered, shifting of the phase of triggering of the switching device causing variation of said DC voltage for varying the motor speed;

a feedback circuit sensing the motor speed and producing a first degenerative feedback signal which varies as a function thereof;

said feedback circuit sensing the motor speed including means for sensing the DC voltage supplied to the motor armature and means for producing a degenerative feedback signal which varies as a function of the motor speed acceleration;

means for producing a first reference voltage proportional to a preselected motor speed;

a further feedback circuit sensing the motor armature current and producing a further feedback signal which varies as a function thereof;

means for producing a second reference voltage proportional to a preselected maximum armature current;

means, interconnecting said further feedback circuit and the means for producing said second reference voltage, for producing a degenerative control signal varying as a function of the voltage by which said further feedback signal exceeds said second reference voltage; and means, responsive to the algebraic sum of said first feedback signal, said first reference voltage and said degenerative control signal, for controlling the phase of triggering of said switching device for maintaining the motor speed substantially equal to said preselected motor speed while substantially preventing the motor armature current from exceeding said preselected maximum.

6. In a controlled-velocity drive as set froth in claim 5, the last said means including a capacitor connected for differentiating the DC voltage supplied to the motor armature.

7. In a controlled-velocity drive having a DC motor the speed of which varies substantially as a function of the voltage applied to the armature thereof, a control for the motor comprising:

a triggerable semiconductor current-switching device connected in a circuit, including an AC power source, for supplying a DC voltage to the motor armature when the switching device is triggered, shifting of the phase of triggering of the switching device causing variation of said DC voltage for varying the motor speed;

a feedback circuit sensing the motor speed and producing a first-degenerative feedback signal which varies as a function thereof;

means for producing a first reference voltage proportional to a preselected motor speed;

a further feedback circuit sensing the motor armature current and producing a further feedback signal which varies as a function thereof;

means for producing a second reference voltage proportional to a preselected maximum armature current;

means, interconnecting said further feedback circuit and the means for producing said second reference voltage, for producing a degenerative control signal varying as a function of the voltage by which said further feedback signal exceeds said second reference voltage;

means, responsive to the algebraic sum of said first feedback signal, said first reference voltage and said degenerative control signal, for controlling the phase of triggering of said switching device for maintaining the motor speed substantially equal to said preselected motor speed while substantially preventing the motor armature current from exceeding said preselected maximum; and an additional feedback circuit including a delay network responsive to the motor armature current and producing a regenerative feedback signal which varies as a function thereof, said means for controlling the phase of triggering of said switching device also being responsive to said regenerative feedback signal.

8. In a controlled-velocity drive having a DC motor the speed of which varies substantially as a function of the voltage applied to the armature thereof, a control for the motor comprising:

a plurality of triggerable semiconductor current-switching devices interconnected with the motor armature and a multiphase AC power source for supplying a DC voltage to the motor armature when triggered in sequence, shifting of the phase of triggering of said devices causing variation of said DC voltage for varying the motor speed;

a first feedback circuit sensing the DC voltage supplied to the motor armature and producing a first-degenerative feedback signal which varies as a function thereof;

a second feedback circuit sensing the rate of change of the DC voltage supplied to the motor armature and producing a second-degenerative feedback signal which varies as a function thereof;

a third feedback circuit sensing the motor speed and including a tachometer generator having an output signal varying as a function of the motor speed;

means for producing a first reference voltage proportional to a preselected motor speed;

a further feedback circuit, including an impedance series-connected with the motor armature, the impedance developing a voltage thereacross which is a function of the motor armature current, said further feedback circuit producing a further feedback signal which varies as a function of the motor armature current;

an additional feedback circuit including a delay network responsive to the voltage developed across said impedance and producing a regenerative delayed feedback signal which varies as a function of the motor armature current;

a compensating feedback circuit sensing the voltage developed across said impedance and producing a compensating feedback signal which varies as a function of said developed voltage;

means for producing a second reference voltage proportional to a preselected maximum armature current;

means, interconnecting said further feedback circuit and said means for producing a second reference voltage, for producing a degenerative control signal varying as a function of the voltage by which said further feedback signal exceeds said second reference voltage;

means for algebraically summing said first and second feedback signals, said tachometer output signal, said first reference voltage, said delayed feedback signal, said compensating feedback signal, and said degenerative control signal and for producing a triggering control signal varying as a function of the algebraic sum; and means for shifting the phase of triggering of said switching devices in response to said triggering control signal for maintaining the motor speed substantially equal to said preselected motor speed while substantially preventing the motor armature current from exceeding said preselected maximum.

* * * * *